Figures 1, 2:
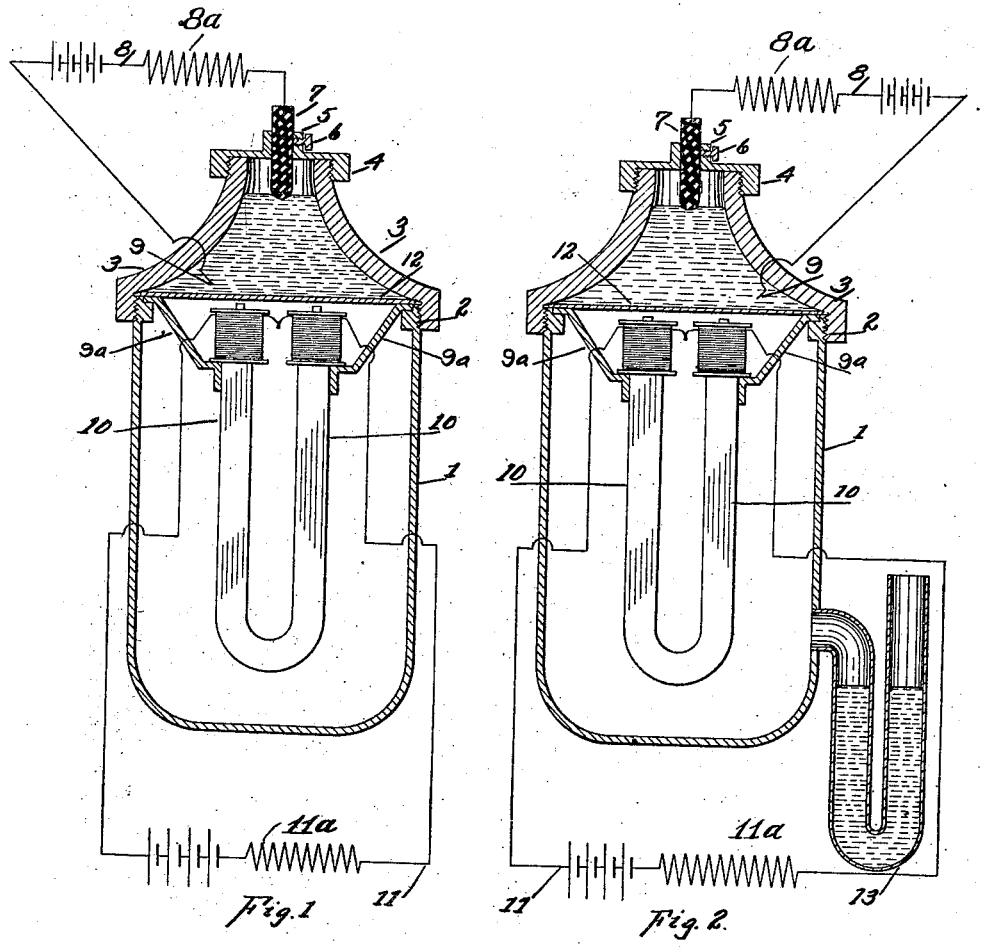

UNITED STATES PATENT OFFICE.

HARRY R. ALLENSWORTH, OF COLUMBUS, OHIO.

RELAY.

1,130,654.

Specification of Letters Patent.

Patented Mar. 2, 1915.

Application filed April 14, 1911. Serial No. 620,898.

*To all whom it may concern:*

Be it known that I, HARRY R. ALLENSWORTH, a citizen of the United States, residing at Columbus, in the county of Franklin and State of Ohio, have invented certain new and useful Improvements in Relays, of which the following is a specification.

My invention relates to relays, and is particularly designed to provide an improved instrument for transmitting vibrations from a primary circuit to a transmitting circuit and accentuating and amplifying the said vibrations with sensitiveness and yet with thorough reliability and precision. In effectuating this improvement, I utilize opposing fluids accurately measured and attuned to an extremely sensitive degree, whereby any extraneous force or power will have an instantaneous effect. The extraneous force will generally be the primary circuit and in this instance, it takes the form of a vibratory diaphragm operable by electro-magnets in the said primary circuit.

More explicitly, it is intended to use a vibratable diaphragm counterbalanced between two fluids which are keenly attuned and responsive to the electro-magnets in the primary circuit upon the most delicate variation of current therein. One of the said counterbalancing fluids is disposed within a transmitting circuit, connecting two contact members and responsive to the vibrations of the diaphragm in such a manner that the superficial contact area is varied in accordance with the vibrations. In furtherance of my aim to render the instrument extremely sensitive, without in any way affecting reliability, is the provision of a chamber for this circuit-closing counterbalancing fluid, which is of a form and area to accentuate and amplify every vibration from the diaphragm in the course of its transmission to the transmitting circuit, which accentuation and amplification are effected by two important features of construction. The first of these is the formation of the chamber in such a manner that the larger superficial area of the fluid body is in contact with the vibratable diaphragm, while the smaller and parallel area is varyingly in coactive relation with one of the said two contacts. The other feature is the provision of a preferably rounded contact, which forms the variable contact surface before mentioned. It will be understood that the constantly decreasing internal area of the chamber which contains the said fluid, necessarily transmits the vibrations of the diaphragm to the said contact in accentuated and amplified form. It will further be understood that the provision of a rounded end for the said contact, still more accentuates the said vibrations which have been received from the said diaphragm by the fluid body.

In the specific embodiment preferably used, my invention takes the form of a receptacle divided into two chambers by a vibratable partition. One chamber preferably contains air and also electro-magnets within and controlled by a primary circuit. The other chamber desirably contains mercury and forms a closure between two contact points of a transmitting circuit, which contact points are located in said chamber. The chamber containing the mercury is preferably of frusto-conical form and has one of the contacts adjustably extending through its smaller end into the body of mercury.

In the accompanying drawings, in which similar characters of reference designate corresponding parts: Figure 1 is a vertical sectional view of one form of my invention, and, Fig. 2 is a vertical sectional view of a slightly modified form of my invention.

The body of the receptacle of the structure shown in Figs. 1 and 2, is designated 1 and is provided at its upper edge with a series of external threads 2 for the reception of an internally threaded cap 3, likewise having its upper end closed by a supplemental cap 4 threaded thereon, and having a concentric perforated collar 5 with a set screw 6 therein for the reception and adjustable maintenance of the carbon point 7 forming one content of a circuit 8 which has a contact 9 extending through the wall of the cap 3.

Carried by the receptacle 1 are bracket members 9ª upon which are mounted electro-magnets 10 within and governed by a primary circuit 11.

Interposed between the cap 3 and the receptacle 1, there is provided a vibratable diaphragm 12 in juxtaposition to and adapted to be vibrated by the electro-magnets 11 subject to the variations in current which are desired to be transmitted to and impressed upon the transmitting circuit in accentuated and amplified form.

The receptacle 1 is filled with air and the chamber formed by the diaphragm 12 and the walls of the cap 3, is filled with a conducting fluid, preferably mercury, and the pressures of said air and conducting fluid are regulated to provide a perfect counterbalancing effect upon the vibratable diaphragm.

The modified form shown in Fig. 2 consists in the addition of a mercury column 13 which serves the purpose of automatically regulating the pressure within the receptacle.

In operation, it will be understood that the variations in current in the primary circuit, serve to overcome the counterbalancing effect in varying measures and degrees. The resultant vibration of the diaphragm necessarily moves the conducting fluid and the impulse given thereto is impressed upon the transmitting circuit in varying degrees of accentuation in accordance with the degrees of vibration. It is first desirable to properly regulate the position of the contact 7.

While my invention is directly applicable to telephonic apparatus, it is equally applicable to various other electrical arts. I therefore designate the portions 8ᵃ and 11ᵃ of the secondary and primary circuits respectively as the working parts of these circuits, which may comprise the transmitter and receiver of a telephone or any of the other well known appliances to which my invention is readily applicable.

What I claim, is—

1. A relay comprising a diaphragm for receiving vibrations, a circuit upon which said vibrations are to be impressed, a fluid medium for transmitting said vibrations from said diaphragm to said circuit, and means for counterbalancing the static effect of said fluid medium on said diaphragm.

2. A relay comprising a vibratory diaphragm, a circuit upon which said vibrations are ultimately impressed, a fluid medium for transmitting said vibrations from said diaphragm to said circuit, said medium being of a form to deliver the vibrations in an accentuated form, and means for counterbalancing the static effect of said fluid medium on said diaphragm.

3. A relay comprising, in combination with a receiving circuit and a transmitting circuit, a diaphragm for receiving vibrations, a fluid medium forming a portion of one of said circuits and contacting directly with said diaphragm, a pressure medium effective on the opposite side of said diaphragm to counterbalance the static effect of said fluid medium, and means for vibrating said diaphragm.

4. A relay comprising, in combination with a receiving circuit and a transmitting circuit, a diaphragm for receiving vibrations, a fluid medium forming a portion of one of said circuits and contacting directly with said diaphragm, a confining structure for said fluid gradually decreasing in section area from said diaphragm to the transmitting point of the confined fluid, a pressure medium effective on the opposite side of said diaphragm to counterbalance the static effect of said fluid medium, and means for vibrating said diaphragm.

5. A relay comprising, in combination with a receiving circuit and a transmitting circuit, a diaphragm adapted to be vibrated by the receiving circuit, fluids exerting an equal pressure on each side of said diaphragm, one of the fluids being in the transmitting circuit whereby the vibrations are impressed on the transmitting circuit.

6. A relay comprising, in combination with a receiving and a transmitting circuit, a diaphragm adapted to be vibrated by the receiving circuit, fluids exerting an equal pressure on each side of said diaphragm, one of the fluids being in the transmitting circuit whereby the vibrations are impressed on the transmitting circuit, and means for so shaping the last mentioned fluid as to accentuate the vibrations in the course of transmission from the diaphragm to the transmitting circuit.

7. A relay comprising, in combination with a receiving and a transmitting circuit, a diaphragm adapted to be vibrated by the receiving circuit, fluids exerting an equal pressure on each side of said diaphragm, one of the fluids being in the transmitting circuit whereby the vibrations are impressed on the transmitting circuit, and a chamber for the last-mentioned fluid of reversely parabolic form.

8. A relay comprising, in combination with a receiving and a transmitting circuit, a diaphragm adapted to be vibrated by the receiving circuit, fluids exerting an equal pressure on each side of said diaphragm, one of the fluids being in the transmitting circuit, and a chamber for the last mentioned fluid gradually decreasing in area from the diaphragm to the transmitting circuit.

9. A relay comprising, in combination with a receiving and a transmitting circuit, a diaphragm adapted to be vibrated by the receiving circuit, fluids exerting an equal pressure on each side of said diaphragm, one of the fluids being in the transmitting circuit, and a chamber for the last mentioned fluid so formed as to provide a large superficial area against the diaphragm, and a relatively small transmitting surface.

10. A relay comprising, in combination with a receiving and a transmitting circuit, a receptacle with two chambers, a diaphragm forming a partition wall between said chambers, means controlled by the receiving circuit and within one chamber to vibrate said diaphragm, a fluid body in the other chamber and in the transmitting circuit to transmit the vibrations to the transmitting circuit and a fluid in said first mentioned chamber for counterbalancing the pressure of said first fluid on the diaphragm.

11. A relay comprising, in combination with a receiving and a transmitting circuit, a receptacle with two chambers, a diaphragm forming a partition wall between the said chambers, electro-magnets within one chamber and controlled by the receiving circuit to vibrate said diaphragm, a fluid body in the other chamber and in the other circuit and affected by the vibrations of said diaphragm and a fluid in said first mentioned chamber for counterbalancing the pressure of said first fluid on the diaphragm.

12. A relay comprising, in combination with a receiving and a transmitting circuit, a diaphragm, fluids exerting an equal pressure on each side of said diaphragm, one of said fluids forming a portion of one of said circuits coacting with said diaphragm to transmit vibrations between said circuits, and means maintaining the relative pressure of the fluid bodies on said diaphragm to form a perfect balance.

13. A relay comprising, in combination with a receiving and a transmitting circuit, a diaphragm, fluids exerting an equal pressure on each side of said diaphragm, one of said fluids forming a portion of one of said circuits coacting with said diaphragm to transmit vibrations between said circuits, and a fluid column acting on one of said fluids and maintaining the relative pressures of both fluid bodies on said diaphragm to form to perfect balance.

14. A relay comprising, in combination with a receiving and a transmitting circuit, a body of fluid forming a portion of the transmitting circuit for transmitting vibrations between said circuits, a diaphragm, means for counterbalancing the static effect of said fluid on said diaphragm by the pressure of another fluid on the other side of said diaphragm, and an adjustable contact coacting with said first named fluid and forming a part of the transmitting circuit to receive the effect of said vibrations.

15. A relay comprising a diaphragm for receiving vibrations to be transmitted, a circuit upon which said vibrations are to be impressed, a fluid medium in vibratory communication with said diaphragm for transmitting said vibrations from the diaphragm to said circuit, and means for maintaining said diaphragm in normal undistorted condition due to the communicating contact therewith of said fluid.

In testimony whereof I affix my signature in presence of two witnesses.

HARRY R. ALLENSWORTH.

Witnesses:
 EDWIN P. CORBETT,
 INGLE A. MORRIS.